United States Patent
Ma

(10) Patent No.: US 8,726,375 B2
(45) Date of Patent: May 13, 2014

(54) METHOD AND DEVICE FOR PREVENTING DOMAIN NAME SYSTEM SPOOFING

(75) Inventor: Shaobu Ma, Beijing (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 222 days.

(21) Appl. No.: 13/150,962

(22) Filed: Jun. 1, 2011

(65) Prior Publication Data

US 2011/0231931 A1 Sep. 22, 2011

Related U.S. Application Data

(63) Continuation of application No. PCT/CN2009/075205, filed on Nov. 30, 2009.

(30) Foreign Application Priority Data

Dec. 1, 2008 (CN) .......................... 2008 1 0180599

(51) Int. Cl.
*G06F 11/00* (2006.01)
(52) U.S. Cl.
USPC ............... 726/22; 726/26; 713/168; 713/187; 709/224
(58) Field of Classification Search
USPC ................ 726/22, 26; 713/168, 187; 709/224
See application file for complete search history.

(56) References Cited

U.S. PATENT DOCUMENTS

| 7,313,815 | B2 | 12/2007 | Pazi et al. | |
|---|---|---|---|---|
| 2002/0158112 | A1 | 10/2002 | Rodhammer | |
| 2005/0044352 | A1* | 2/2005 | Pazi et al. | ...................... 713/153 |

FOREIGN PATENT DOCUMENTS

| CN | 1499396 | A | 5/2004 |
|---|---|---|---|
| CN | 101420433 | A | 4/2009 |
| EP | 1691538 | A1 | 8/2006 |
| WO | 2008072886 | A1 | 6/2008 |

OTHER PUBLICATIONS

Liang, "Study on IDN Spoofing Behaviors and Defense Methods", Network Communications and Security, 2007, pp. 1-13.*
Dagon et al. "Increased DNS Forgery Resistance Through 0x20-Bit Encoding" ACM, 2008 pp. 211-222.*
$1^{st}$ Office Action in corresponding Chinese Application No. 200810180599.6 (May 19, 2011).
International Search Report in corresponding PCT Application No. PCT/CN2009/075205 (Mar. 11, 2010).
Liang, "Study on IDN Spoofing Behaviours and Defence Methods," Department of Physics, Dec. 31, 2007, China Academic Journal Electronic Publishing House, Chengdu, China.
Rejection Decision in corresponding Chinese Patent Application No. 200810180599.6 (Feb. 29, 2012).
Written Opinion of the International Searching Authority in corresponding International Patent Application No. PCT/CN2009/075205 (Mar. 11, 2010).

* cited by examiner

*Primary Examiner* — Shewaye Gelagay
(74) *Attorney, Agent, or Firm* — Leydig, Voit & Mayer, Ltd.

(57) ABSTRACT

A method for preventing Domain Name System (DNS) spoofing includes: performing uppercase/lowercase conversion for letters of a DNS question field in a DNS request packet according to a preset rule; sending the DNS request packet; receiving a DNS response packet; obtaining uppercase/lowercase distribution of the letters of the DNS question field in the DNS response packet; and forwarding the DNS response packet to a target DNS client if the uppercase/lowercase distribution of the letters of the DNS question field in the DNS response packet complies with the preset rule. Corresponding to the method, a device for preventing DNS spoofing is disclosed. The method and device reduce occupation of storage resources of the device.

2 Claims, 3 Drawing Sheets

METHOD AND DEVICE FOR PREVENTING DOMAIN NAME SYSTEM SPOOFING

CROSS-REFERENCE TO RELATED APPLICATIONS

This application is a continuation of International Application No. PCT/CN2009/075205, filed on Nov. 30, 2009, which claims priority to Chinese Patent Application No. 200810180599.6, filed on Dec. 1, 2008, both of which are hereby incorporated by reference in their entireties.

FIELD OF THE INVENTION

The present invention relates to the field of communication technologies, and in particular, to a method and device for preventing Domain Name System (DNS) spoofing.

BACKGROUND OF THE INVENTION

DNS spoofing, also known as DNS cache poison, means that an attacker sends plenty of fake DNS response packets to a DNS server or a host under certain conditions. The response packets are direct to legal domain names to malicious Internet Protocol (IP) addresses to spoof the receiver.

Such attacks may lead to at least the following consequences:

1. The DNS cache poison can propagate the malicious IP address in a wider scope.
2. The user is misled to a malicious website.
3. The Local Area Network (LAN) is manipulated as an attacking tool.
4. Denial of Service (DoS) attacks are launched to the DNS server.

Potential targets of the attacks are the DNS server, host, or user application such as a browser or a DNS query software, which are known as DNS clients.

Firewalls are generally used to prevent DNS spoofing. Conventional preventive measures are as follows:

(1) In a bidirectional communication environment, the firewall records the DNS request packets sent by a DNS client. After receiving a response packet, the firewall matches the DNS response packet with the records stored in the firewall. If a record is matched successfully, the firewall accepts the DNS response packet and forwards it to the DNS client; if no record is matched successfully, the firewall discards the DNS response packet to prevent receiving a fake DNS response packet sent by hackers.

(2) After receiving a DNS response packet, the firewall constructs a new DNS request packet according to the information in the response packet, and then sends the DNS request packet and records the data about the DNS request packet. After receiving the next DNS response packet, the firewall checks whether the DNS response packet matches the recorded DNS request packet. If the DNS response packet matches the recorded DNS request packet, the firewall accepts the DNS response packet and forwards it to the target DNS client; if the DNS response packet does not match the recorded DNS request packet, the firewall discards it.

In the process of researching and practicing the conventional art, the inventor of the present invention finds at least the following problems in the conventional art:

In the first preventive measure as discussed above, if many DNS request packets are received, the firewall has to store the DNS request packets, which will occupy a lot of memory resources of the firewall.

In the second preventive measure as discussed above, if many DNS response packets are received, the generated DNS request packets are enormous; the firewall has to store the data about the generated DNS request packets, which makes the system overloaded or even leads to DoS.

SUMMARY OF THE INVENTION

Embodiments of the present invention provide a method and device for preventing DNS spoofing to reduce occupation of the storage resources of the device.

A method for preventing DNS spoofing in an embodiment of the present invention includes:

performing uppercase/lowercase conversion for letters of a DNS question field in a DNS request packet according to a preset rule;

sending the DNS request packet;

receiving a DNS response packet;

obtaining uppercase/lowercase distribution of letters of the DNS question field in the DNS response packet; and forwarding the DNS response packet to a target DNS client if the uppercase/lowercase distribution of the letters of the DNS question field in the DNS response packet complies with the preset rule.

A device for preventing DNS spoofing in an embodiment of the present invention includes:

an uppercase/lowercase converting unit, configured to perform uppercase/lowercase conversion for letters of a DNS question field in a DNS request packet according to a preset rule;

a sending unit, configured to send the DNS request packet converted by the uppercase/lowercase converting unit;

a first receiving unit, configured to receive a DNS response packet;

an obtaining unit, configured to obtain uppercase/lowercase distribution of letters of the DNS question field in the DNS response packet received by the first receiving unit; and a forwarding unit, configured to forward the DNS response packet to a target DNS client if the uppercase/lowercase distribution of the letters of the DNS question field in the DNS response packet complies with the preset rule.

It can be seen from the above technical solution that, according to embodiments of the present invention, the uppercase/lowercase distribution of the letters of the DNS question field is obtained from the DNS response packet, and a judgment about whether the uppercase/lowercase distribution complies with the preset rule is made to ensure reliability of the DNS response packet and prevent DNS spoofing. The device can prevent the DNS spoofing without recording the data about the DNS request packet, thus saving the storage resources of the device significantly.

BRIEF DESCRIPTION OF THE DRAWINGS

To describe the technical solution under the present invention more clearly, the following outlines the accompanying drawings involved in the embodiments of the present invention. Apparently, the accompanying drawings outlined below are not exhaustive, and persons of ordinary skill in the art can derive other drawings from such accompanying drawings without creative effort.

DETAILED DESCRIPTION OF THE EMBODIMENTS

Figure 1:
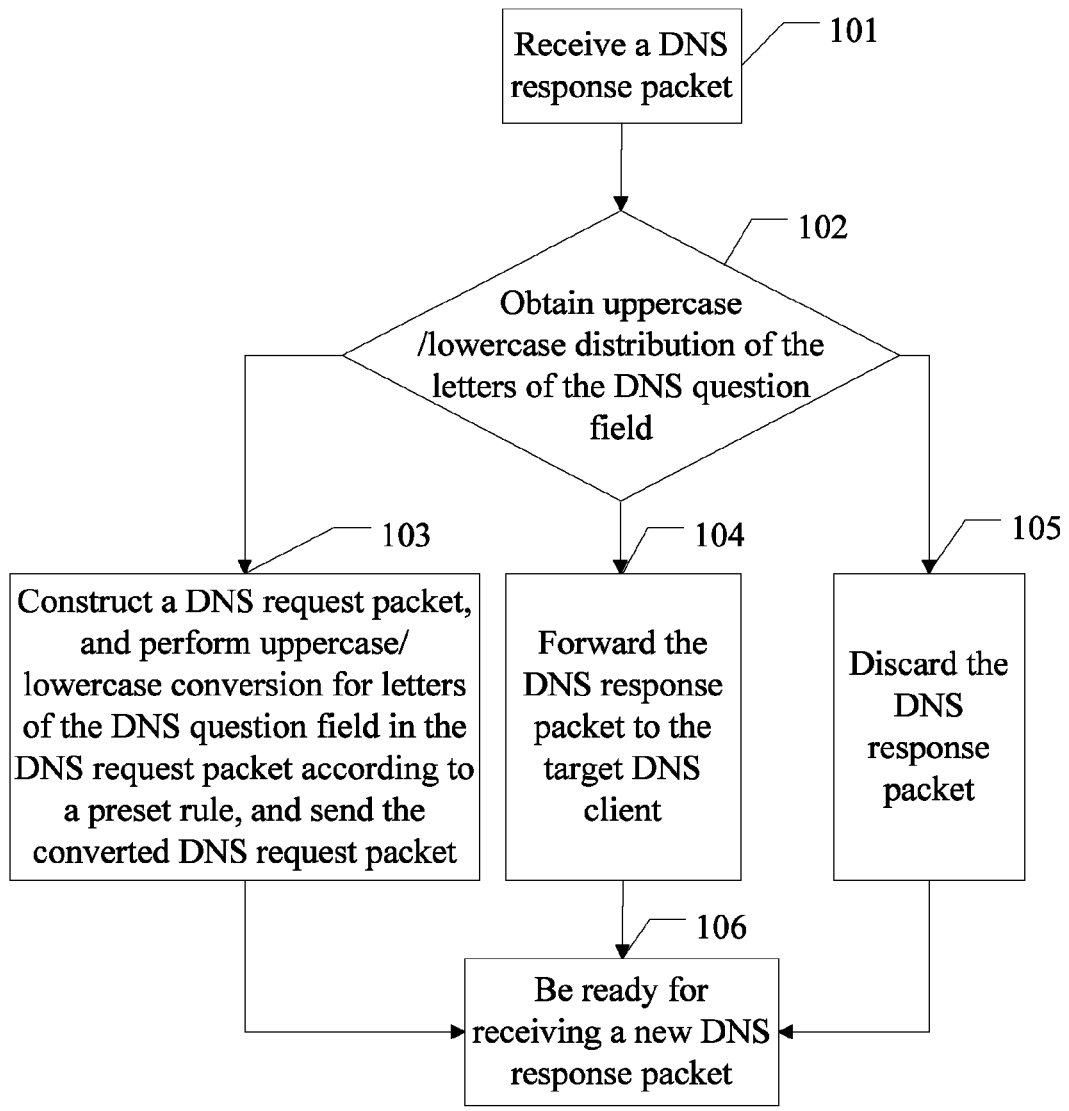
FIG. 1 is a flowchart of a method for preventing DNS spoofing in a first embodiment of the present invention.

The following detailed description is given with reference to the accompanying drawings to provide a thorough understanding of the present invention. Evidently, the drawings and the detailed description are merely representative of particular embodiments of the present invention, and the embodiments are illustrative in nature and not exhaustive. All other embodiments, which can be derived by those skilled in the art from the embodiments given herein without creative effort, shall fall within the protection scope of the present invention.

The embodiments of the present invention provide a method and device for preventing DNS spoofing to reduce the data stored in the device for preventing DNS spoofing, and save the storage resources of the device for preventing DNS spoofing.

In the method for preventing DNS spoofing in an embodiment of the present invention, the device for preventing DNS spoofing performs uppercase/lowercase conversion for letters of a DNS question field in a DNS request packet according to a preset rule; sends the DNS request packet; receives a DNS response packet; obtains uppercase/lowercase distribution of the letters of the DNS question field in the DNS response packet; and forwards the DNS response packet to a target DNS client if the uppercase/lowercase distribution of the letters of the DNS question field in the DNS response packet complies with the preset rule.

In practice, the letters of a DNS question field in the DNS request packet are generally all uppercase or all lowercase, and more often, the letters are all lowercase. The DNS question field in the DNS response packet returned by the DNS server is consistent with that in the DNS request packet. If the letters of the DNS question field in the DNS request packet have undergone uppercase/lowercase conversion according to a preset rule, the uppercase/lowercase distribution of the letters of the DNS question field in the DNS response packet returned by the DNS server should comply with the preset rule. Therefore, in the method for preventing DNS spoofing in this embodiment, the device performs uppercase/lowercase conversion for the letters of the DNS question field in the DNS request packet according to a preset rule, obtains the uppercase/lowercase distribution of the letters of the DNS question field in the received DNS response packet, and forwards only the DNS response packet compliant with the preset rule to the target DNS client, thus preventing the DNS client from receiving the DNS response packet faked by hackers.

Through the method for preventing DNS spoofing in this embodiment, the device for preventing DNS spoofing can prevent DNS spoofing without recording the DNS request packets, thus saving the storage resources of the device significantly.

In practice, the device for preventing DNS spoofing may be a firewall or another device.

Depending on the application environment, the method may work differently:

In a bidirectional communication environment, the DNS request packet is sent by a DNS client. After receiving the DNS request packet from the DNS client, the device for preventing DNS spoofing performs uppercase/lowercase conversion for the letters of the DNS question field in the DNS request packet according to a preset rule. After receiving the DNS response packet, the device discards the DNS response packet if the uppercase/lowercase distribution of the letters of the DNS question field in the DNS response packet does not comply with the preset rule.

In a unidirectional communication environment, the device for preventing DNS spoofing receives a DNS response packet, and checks the uppercase/lowercase distribution of the letters of the DNS question field in the DNS response packet. If the letters of the DNS question field in the DNS response packet are all uppercase or all lowercase, the device constructs the corresponding DNS request packet according to the DNS response packet, performs uppercase/lowercase conversion for the letters of the DNS question field in the DNS request packet according to a preset rule, and sends the DNS request packet. If the uppercase/lowercase distribution of the letters of the DNS question field in the DNS response packet does not comply with the preset rule and the letters are neither all uppercase nor all lowercase, the device discards the DNS response packet.

Depending on the actual conditions, the preset rule varies. The following description takes four preset rules as examples:

Preset rule 1: Perform uppercase/lowercase conversion for letters of the DNS question field in the DNS request packet randomly.

After receiving a DNS response packet, the device obtains the uppercase/lowercase distribution of the letters of the DNS question field in the DNS response packet, and checks whether the letters include uppercase letters and lowercase letters. If the letters include uppercase letters and lowercase letters, the uppercase/lowercase distribution of the letters is regarded as compliant with the preset rule. This method is easy to implement.

Preset rule 2: Perform uppercase/lowercase conversion for letters of the DNS question field in the DNS request packet according to a preset value.

For example, "1001101110" is a preset value composed of 10 bits, where bit "1" refers to converting the letter into uppercase, and bit "0" refers to converting the letter into lowercase. If the number of letters is more than the number of bits of the preset value, the preset value is applied to the letters cyclically. The specific codes of the DNS domain name part are ignored. Supposing the domain name is "www.huaweisymantec.com" composed of 20 letters, and the preset value is composed of 10 bits, the number of letters is more than the number of bits of the preset value. Therefore, "1001101110" needs to be applied cyclically, and "www.huaweisymantec.com" is converted into "Www.HUaWEIsYmaNTeC.COm". After receiving the DNS response packet, the device for preventing DNS spoofing obtains the uppercase/lowercase distribution of the DNS question field in the DNS response packet. If the uppercase/lowercase distribution of the letters complies with the regularity of "1001101110", the device forwards the DNS response packet to the target DNS client.

In this exemplary embodiment, bit "1" refers to converting the letter into uppercase, and bit "0" refers to converting the letter into lowercase. In practice, bit "0" may refer to converting the letter into uppercase and bit "1" may refer to converting the letter into lowercase.

Further, the preset value may be a random number. The device for preventing DNS spoofing stores the random number. After a DNS response packet is received, the device compares the stored random number with the uppercase/lowercase distribution of the letters of the DNS question field in the DNS response packet.

Further, the preset value may be a random value which changes periodically.

Preset rule 3: Use the source IP address, or destination IP address, or source port, or destination port, or DNS identifier, or DNS question field data in the DNS request packet to perform Hash calculation, and perform uppercase/lowercase conversion for the letters of the DNS question field in the DNS request packet according to the value obtained by the Hash calculation.

The DNS request packet generally includes key fields such as source IP address, destination IP address, source port, destination port, DNS identifier, and DNS question field data. The key fields in the DNS response packet returned by the DNS server are the same as those in the sent DNS request packet. Therefore, after the key fields of the DNS response packet are calculated through the same Hash algorithm, the obtained result should be the same as the result of calculating the key fields of the DNS request packet. One of the key fields of the DNS response packet may be selected randomly for Hash calculation, and the obtained Hash result is used to perform uppercase/lowercase conversion for the letters of the DNS question field in the DNS request packet. The conversion method has been described above.

Preset rule 4: Use the source IP address, or destination IP address, or source port, or destination port, or DNS identifier, or DNS question field data, or answer field in the received DNS response packet to perform Hash calculation if the letters of the DNS question field in the received DNS response packet are all uppercase or all lowercase, which indicates that the DNS response packet is received for the first time and that the letters of the DNS question field have not undergone uppercase/lowercase conversion; and perform uppercase/lowercase conversion for the letters of the DNS question field in the DNS request packet according to the value obtained by the Hash calculation.

The following expounds the method for preventing DNS spoofing in an embodiment of the present invention. FIG. 1 shows a method for preventing DNS spoofing in a unidirectional communication environment in the first embodiment of the present invention. The method includes the following steps:

101. The device for preventing DNS spoofing receives a DNS response packet that carries a DNS question field.

In the unidirectional communication environment, the device for preventing DNS spoofing receives no DNS request packet from the DNS client. However, the system is also applicable in a bidirectional communication environment.

102. The device for preventing DNS spoofing obtains uppercase/lowercase distribution of the letters of the DNS question field in the DNS response packet.

If the letters of the DNS question field in the DNS response packet are all uppercase or all lowercase, step 103 is performed.

If the uppercase/lowercase distribution of the letters of the DNS question field in the DNS response packet complies with the preset rule, step 104 is performed.

If the uppercase/lowercase distribution of the letters of the DNS question field in the DNS response packet does not comply with the preset rule, and the letters are neither all uppercase nor all lowercase, step 105 is performed.

103. The device constructs the corresponding DNS request packet according to the DNS response packet, performs uppercase/lowercase conversion for letters of the DNS question field in the DNS request packet according to the preset rule, and sends the DNS request packet, and step 106 is performed.

This embodiment is applicable to a unidirectional communication environment. In the unidirectional communication environment, the device for preventing DNS spoofing receives no DNS request packet from the DNS client. After receiving the DNS response packet, the device constructs a DNS request packet according to the DNS response packet, performs uppercase/lowercase conversion for the letters of the DNS question field in the DNS request packet, and sends the constructed DNS request packet to the source address of the DNS response packet. If the source address is a legal DNS server, the DNS server sends the DNS response packet to the DNS client for a second time in response to the DNS request packet. The DNS response packet sent for the second time is basically consistent with the DNS response packet sent for the first time. As a result of uppercase/lowercase conversion, the uppercase/lowercase distribution of the letters of the DNS question field in the DNS response packet is the same as that in the DNS request packet.

Therefore, the device for preventing DNS spoofing needs to judge whether the DNS response packet is received for the first time and whether the letters of the DNS question field have not undergone uppercase/lowercase conversion. If the DNS response packet is received for the first time, the letters of the DNS question field in the DNS response packet should be all uppercase or all lowercase. Therefore, if the letters of the DNS question field in the DNS response packet are all uppercase or all lowercase, it is determined that the letters of the DNS question field in the received DNS response packet have not undergone uppercase/lowercase conversion, and the device needs to convert the packet into a DNS request packet, and perform uppercase/lowercase conversion for the letters of the DNS question field.

Table 1 shows the data format of the DNS response packet:

TABLE 1

| Data format of a DNS response packet | |
|---|---|
| 0                                    15 16                                   31 | |
| Identifier | Flag |
| Number of questions | Number of resource records |
| Number of authorized resource records | Number of extra resource records |
| Query domain name filed (variable length) | |
| Answer field (variable length) | |
| Authorization (variable length) | |
| Extra information (variable length) | |

At the time of constructing the DNS request packet according to the received DNS response packet, the number of resource records, the number of authorized resource records, and the number of extra resource records are set to 0; the answer field, authorization field, and extra information field are discarded; the flag field is changed according to the standard; and the identifier field and the number of questions remain unchanged.

Afterward, the device performs Hash calculation according to the relevant fields in the received DNS response packet, for example, source IP address, or destination IP address, or source port, or destination port, or DNS identifier, or DNS question field data, or answer field in the DNS response packet; and performs uppercase/lowercase conversion for the letters of the DNS question field in the DNS request packet according to the Hash value obtained by the Hash calculation.

The algorithm of the Hash calculation may be designed at discretion, and the algorithm characterized by a small calculation load and high randomness is preferred. The Hash value may include 32 bits or 64 bits. Afterward, all letters of the DNS question field in the DNS response packet undergo uppercase/lowercase conversion one by one according to the Hash value.

Supposing that the Hash value is H, the device converts the first letter of the DNS question field into uppercase if the first bit of H is 1, or converts it into lowercase if the first bit of H is not 1; the device converts the second letter of the DNS question field into uppercase if the second bit of H is 1, or converts it into lowercase if the second bit of H is not 1, until the last letter of the DNS question field is converted. If the number of letters in the DNS question field is greater than the number of bits of the H value, the H value can be applied cyclically.

The device transposes the source port number with the destination port number of the User Datagram Protocol (UDP) header, transposes the source IP address with the destination IP address of the IP header, and fills the corresponding position with the correct length and check sum.

After constructing the DNS request packet, the device sends the DNS request packet to the source IP address of the DNS response packet.

If the received DNS response packet is legal, the DNS server returns a new DNS response packet after receiving the DNS request packet, where the key fields and the DNS question field in the new DNS response packet are the same as those in the previous DNS response message. Afterward, the DNS server uses the relevant fields to perform Hash calculation, and uses the Hash calculation result to check consistency. If the received DNS response packet is illegal, in most cases, the source IP address of the packet is directed to an invalid address, and it is impossible to return a new DNS response packet.

At the time of using an answer field of the DNS response packet to perform Hash calculation, if the DNS question field or the answer field in the received DNS response packet has been replaced, the DNS response packet is unable to pass authentication and is discarded.

104. The device forwards the DNS response packet to the target DNS client. The procedure proceeds to step 106.

If the uppercase/lowercase distribution of the letters of the DNS question field in the DNS response packet complies with the preset rule, it is determined that the DNS response packet is secure and can be forwarded to the target DNS client.

105. The device discards the DNS response packet.

If the uppercase/lowercase distribution of the letters of the DNS question field in the DNS response packet does not comply with the preset rule, and the letters are neither all uppercase nor all lowercase, it indicates that the DNS response packet has undergone uppercase/lowercase conversion and is not received for the first time or not compliant with the preset rule. That is, the DNS response packet is probably replaced or faked by a hacker, and should be discarded.

106. The device is ready for receiving a new DNS response packet.

The procedure ends.

Through the method for preventing DNS spoofing in the first embodiment, the device for preventing DNS spoofing can prevent DNS spoofing without recording the data about the DNS request packets, thus saving the storage resources of the device significantly.

Figure 2:
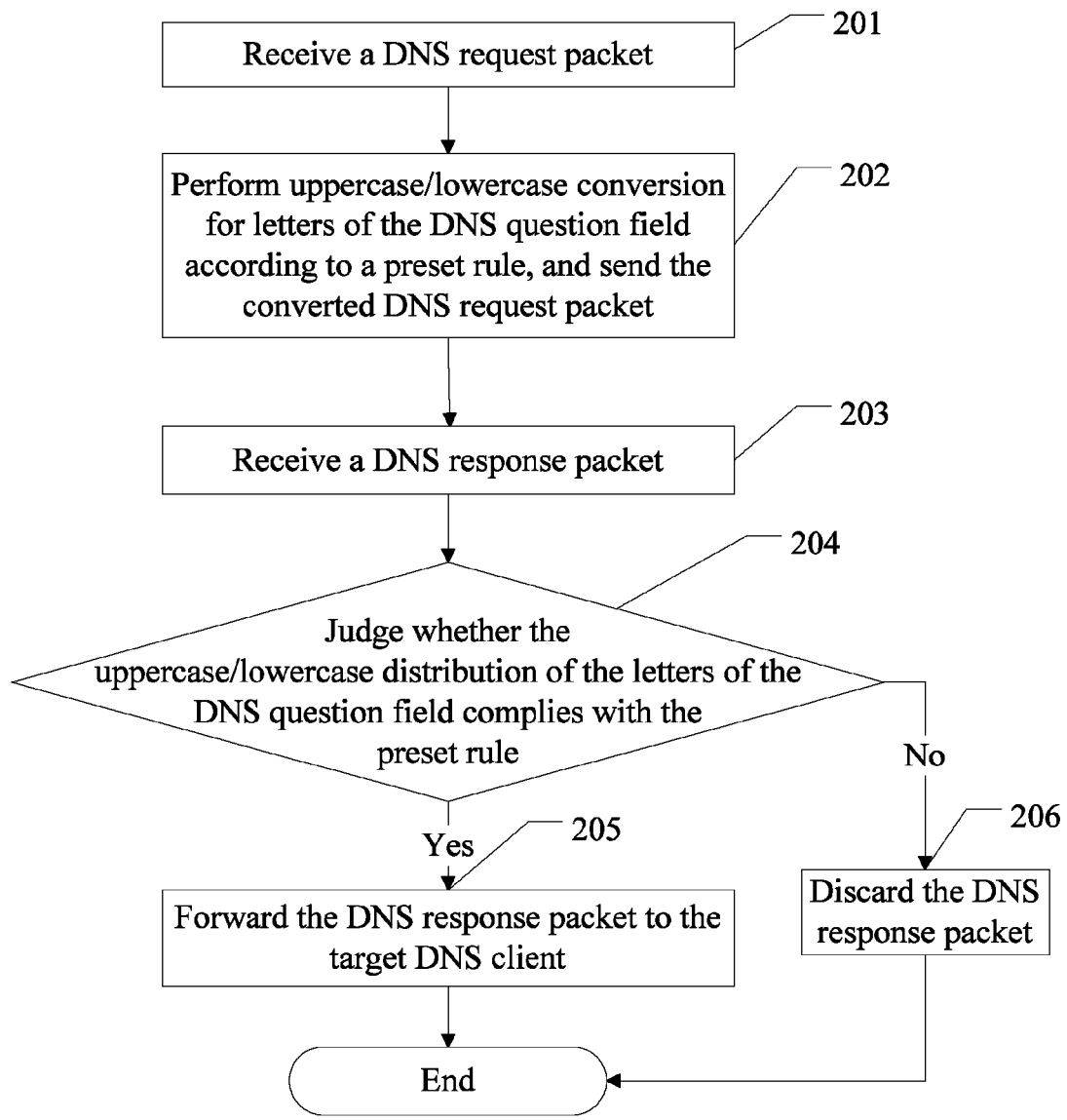
FIG. 2 is a flowchart of a method for preventing DNS spoofing in a second embodiment of the present invention.

FIG. 2 is a flowchart of a method for preventing DNS spoofing in a bidirectional communication environment in the second embodiment of the present invention. The method includes the following steps:

201. The device for preventing DNS spoofing receives a DNS request packet that carries a DNS question field.

The device for preventing DNS spoofing receives a DNS request packet from a DNS client.

202. The device performs uppercase/lowercase conversion for letters of the DNS question field in the DNS request packet according to a preset rule, and sends the converted DNS request packet.

The conversion method has been described in the embodiment above.

203. The device for preventing DNS spoofing receives a DNS response packet.

204. The device for preventing DNS spoofing judges whether the uppercase/lowercase distribution of the letters of the DNS question field in the DNS response packet complies with the preset rule. If the uppercase/lowercase distribution of the letters of the DNS question field in the DNS response packet complies with the preset rule, step 205 is performed; if the uppercase/lowercase distribution of the letters of the DNS question field in the DNS response packet does not comply with the preset rule, step 206 is performed.

205. The device forwards the DNS response packet to the target DNS client.

If the uppercase/lowercase distribution of the letters of the DNS question field in the DNS response packet complies with the preset rule, it is determined that the DNS response packet is secure and can be forwarded to the target DNS client.

The procedure ends.

206. The device discards the DNS response packet.

In the bidirectional communication environment, each DNS response packet sent by the DNS server is a response to a DNS request packet. Therefore, all DNS response packets incompliant with the preset rule are illegal and should be discarded.

The procedure ends.

Through the method for preventing DNS spoofing in the second embodiment, the device for preventing DNS spoofing can prevent DNS spoofing without recording the data about the DNS request packets, thus saving the storage resources of the device significantly.

Figure 3:
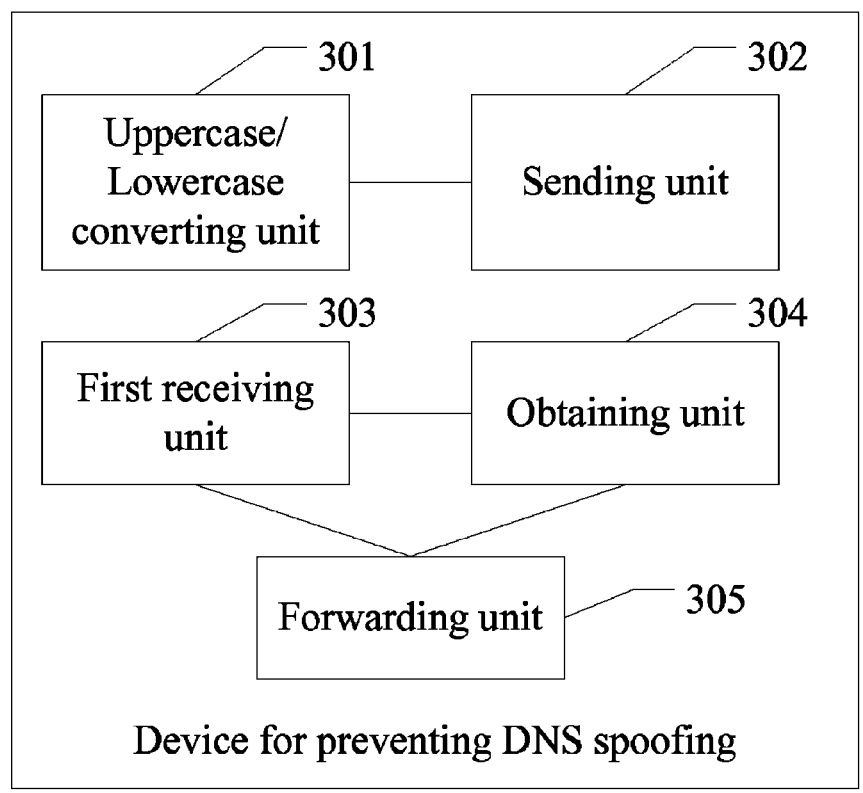
FIG. 3 shows a structure of a device for preventing DNS spoofing in an embodiment of the present invention.

FIG. 3 shows a structure of a device for preventing DNS spoofing in an embodiment of the present invention. The device includes:

an uppercase/lowercase converting unit 301, configured to perform uppercase/lowercase conversion for letters of a DNS question field in a DNS request packet according to a preset rule;

a sending unit 302, configured to send the DNS request packet converted by the uppercase/lowercase converting unit 301;

a first receiving unit 303, configured to receive a DNS response packet;

an obtaining unit 304, configured to obtain uppercase/lowercase distribution of the letters of the DNS question field in the DNS response packet received by the first receiving unit 303; and a forwarding unit 305, configured to forward the DNS response packet to a target DNS client if the uppercase/lowercase distribution of the letters of the DNS question field in the DNS response packet complies with the preset rule.

In a bidirectional communication environment, the device further includes:

a second receiving unit, configured to receive the DNS request packet sent by a DNS client before the uppercase/lowercase converting unit performs uppercase/lowercase conversion for the letters of the DNS question field in the DNS request packet according to the preset rule; and a first discarding unit, configured to discard the DNS response packet if the uppercase/lowercase distribution of the letters of the DNS question field in the DNS response packet received by the first receiving unit does not comply with the preset rule.

In a unidirectional communication environment, the device further includes:

a request packet constructing unit, configured to: construct a corresponding DNS request packet according to the DNS response packet if the letters of the DNS question field in the DNS response packet received by the first receiving unit are all uppercase or all lowercase after the obtaining unit obtains the uppercase/lowercase distribution of such letters; and control the uppercase/lowercase converting unit to perform uppercase/lowercase conversion for the letters of the DNS question field in the corresponding DNS request packet according to the preset rule, and send the converted DNS request packet; and a second discarding unit, configured to discard the DNS response packet if the uppercase/lowercase distribution of the letters of the DNS question field in the DNS response packet received by the first receiving unit does not comply with the preset rule and the letters are neither all uppercase nor all lowercase after the obtaining unit obtains the uppercase/lowercase distribution of such letters.

For the detailed method of using the device for preventing DNS spoofing in this embodiment, see the method embodiment above.

Through the device for preventing DNS spoofing in this embodiment, the device for preventing DNS spoofing can prevent DNS spoofing without recording the data about the DNS request packets, thus saving the storage resources of the device significantly.

Persons of ordinary skill in the art should understand that all or part of the steps of the method under the present invention may be implemented by a program instructing relevant hardware. The program may be stored in a computer readable storage medium. When the program runs, the steps of the method specified in any of the embodiments above can be performed. The storage medium may be a magnetic disk, a Compact Disk-Read Only Memory (CD-ROM), a Read Only Memory (ROM), or a Random Access Memory (RAM).

Detailed above are a method and device for preventing DNS spoofing under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A method for preventing Domain Name System (DNS) spoofing comprising:
performing uppercase/lowercase conversion for a portion of first letters in a DNS inquiry field of a DNS request packet according to a preset rule;
sending the DNS request packet to a DNS server;
receiving a DNS response packet in response to the DNS request packet;
obtaining uppercase/lowercase distribution of second letters in a DNS inquiry field of the DNS response packet;
determining that the uppercase/lowercase distribution of the second letters in the DNS inquiry field of the DNS response packet complies with the preset rule; and
based upon the determining, forwarding the DNS response packet to a target DNS client;
wherein the performing the uppercase/lowercase conversion for the portion of the first letters in the DNS inquiry field of the DNS request packet according to the preset rule comprises:
performing Hash calculation by using one or more of: a source Internet Protocol (IP) address, a destination IP address, a source port, a destination port, a DNS identifier, a DNS question field data, and an answer field in the DNS response packet, and
performing the uppercase/lowercase conversion for the portion of the first letters in the DNS inquiry field of the DNS request packet according to a value obtained by the Hash calculation;
wherein the determining that the uppercase/lowercase distribution of the second letters in the DNS inquiry field of the DNS response packet complies with the preset rule comprises:
determining that the uppercase/lowercase distribution of the second letters in the DNS inquiry field of the DNS response packet complies with the value obtained by the Hash calculation.

2. A device for preventing Domain Name System (DNS) spoofing, comprising:
a memory;
one or more processors; and
one or more modules stored in the memory and configured for execution by the one or more processors, the one or more modules including instructions when executed by the one or more processors causing the one or more processors to:
perform uppercase/lowercase conversion for a portion of first letters in a DNS inquiry field of a DNS request packet according to a preset rule;
send the DNS request packet to a DNS server;
receive a DNS response packet in response to the DNS request packet;
obtain uppercase/lowercase distribution of second letters in a DNS inquiry field of the DNS response packet
determine that the uppercase/lowercase distribution of the second letters in the DNS inquiry field of the DNS response packet complies with the preset rule; and
based upon the determining forward the DNS response packet to a target DNS client,
wherein the one or more processors performing uppercase/lowercase conversion for the portion of the first letters in the DNS inquiry field of the DNS request packet according to the preset rule comprises:
performing Hash calculation by using one or more of: a source Internet Protocol (IP) address, a destination IP address, a source port, a destination port, a DNS identifier, a DNS question field data, and an answer field in the DNS response packet,
performing the uppercase/lowercase conversion for the portion of the first letters in the DNS inquiry field of the DNS request packet according to a value obtained by the Hash calculation;
wherein the one or more processors determining that the uppercase/lowercase distribution of the second letters in the DNS inquiry field of the DNS response packet complies with the preset rule comprises:
determining that the uppercase/lowercase distribution of the second letters in the DNS inquiry field of the DNS response packet complies with the value obtained by the Hash calculation.

* * * * *